US012603675B2

(12) United States Patent　　　　　(10) Patent No.:　US 12,603,675 B2
Yu et al.　　　　　　　　　　　　　　　(45) Date of Patent:　　Apr. 14, 2026

(54) METHOD AND SYSTEM FOR HIGH SPEED CABLE TESTING

(71) Applicant: Quanta Computer Inc., Taoyuan City (TW)

(72) Inventors: Chun-Ching Yu, Taoyuan City (TW); Chih-Chia Huang, Taoyuan City (TW); Chih-Liang Hsu, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 106 days.

(21) Appl. No.: 18/799,488

(22) Filed: Aug. 9, 2024

(65) Prior Publication Data

US 2025/0350317 A1　　Nov. 13, 2025

Related U.S. Application Data

(60) Provisional application No. 63/645,502, filed on May 10, 2024.

(51) Int. Cl.
　　*H04B 3/46*　　　　　(2015.01)
　　*G06F 7/58*　　　　　(2006.01)
(52) U.S. Cl.
　　CPC ............... *H04B 3/46* (2013.01); *G06F 7/582* (2013.01)
(58) Field of Classification Search
　　CPC .................................. H04B 3/46; G06F 7/582
　　See application file for complete search history.

(56) References Cited

U.S. PATENT DOCUMENTS

| | | | |
|---|---|---|---|
| 2008/0226288 A1* | 9/2008 | Miller | H04B 10/073 |
| | | | 398/9 |
| 2016/0124034 A1* | 5/2016 | Shoor | G01M 11/33 |
| | | | 356/73.1 |
| 2022/0034967 A1 | 2/2022 | Strickling et al. | |
| 2023/0269131 A1 | 8/2023 | Chappell et al. | |

FOREIGN PATENT DOCUMENTS

| | | |
|---|---|---|
| TW | 200939655 A | 9/2009 |
| TW | 201940890 A | 10/2019 |
| TW | 202220425 A | 5/2022 |

OTHER PUBLICATIONS

TW Office Action for Application No. 113140101 mailed May 2, 2025, w/ First Office Action Summary, 7 pp.
TW Search Report for Application No. 113140101 mailed May 2, 2025 w/ First Office Action, 1 p.

* cited by examiner

*Primary Examiner* — David S Huang
(74) *Attorney, Agent, or Firm* — NIXON PEABODY LLP

(57) ABSTRACT

A system and method for testing high speed cables for a computer system is disclosed. A test vehicle module includes a signal generator that may be a re-timer chip. The test vehicle module also includes a board management controller coupled to the signal generator. A memory is coupled to the board management controller. The memory stores diagnostic software executable by the board management controller. A connector is coupled to the signal generator to transmit and receive cable test signals from terminals of a cable through an adaptor baseboard. The controller executes the diagnostic software to send cable test signals through the signal generator, receive test signals from another test vehicle module, and generates test data from the received test signals.

20 Claims, 13 Drawing Sheets

Cable Cartridge Test Scope_Cable Cartridge Test check Items

500 →

| Test Item | SERDES Scope | Check Items |
|-----------|-------------|-------------|
| 510 Check lane map settings | Physical lane | Schematics and configuration table |
| 512 Check polarity settings | Physical lane | Schematics and configuration table |
| 514 SERDES status dump | Physical lane | SD(flip), LCK(flip), TXEQ, BER |
| 516 Show port status | Logical port | Link status |
| 518 BER Projection | Physical lane | Link quality (Need to define Frame Error Counts criteria or analyses) |
| 520 FEC status error counter monitor | Physical lane | Link quality. Enable FEC C counters to latch before calling FEC status to read the counters. Behave like Flight Data Recorder (FDR). |
| 522 Cross Talk | Physical lane | Link quality comparison PRBS per lane with PRBS per Cable Cartridge (Need to define Pre-FEC / Post-FEC BER differences) |

| PreFec | 1.00E-07 | | | | | |
| PostFec | 1.00E-16 | | | CP_SITV-02-128.130. | | |
| Port | Lane | Fec(t=15) | DSC | SNR | prbsstat |
|---|---|---|---|---|---|
| 8 | 6 | 0 | 2.80E-10 | 27.03 | 1.60E-13 |
| | 7 | 0 | 2.80E-10 | 27.35 | 1.60E-13 |
| | 0 | 0 | 2.80E-10 | 25.78 | 1.60E-13 |
| | 1 | 0 | 2.80E-10 | 25.67 | 1.60E-13 |
| | 2 | 0 | 3.80E-10 | 22.45 | 8.40E-10 |
| | 3 | 0 | 2.80E-10 | 23.56 | 1.30E-11 |
| | 4 | 0 | 2.80E-10 | 27.67 | 1.60E-13 |
| | 5 | 0 | 2.80E-10 | 27.82 | 1.60E-13 |
| | 6 | 0 | 2.80E-10 | 27.57 | 1.60E-13 |
| | 7 | 0 | 2.80E-10 | 27.21 | 1.60E-13 |
| 9 | 0 | 0 | 2.80E-10 | 27.12 | 1.60E-13 |
| | 1 | 0 | 2.80E-10 | 27.37 | 1.60E-13 |
| | 2 | 0 | 2.80E-10 | 27.63 | 1.60E-13 |
| | 3 | 0 | 2.80E-10 | 27.02 | 1.60E-13 |
| | 4 | 0 | 2.80E-10 | 27.08 | 1.60E-13 |
| | 5 | 0 | 2.80E-10 | 27.52 | 1.60E-13 |
| | 6 | 0 | 2.80E-10 | 26.45 | 1.60E-13 |
| | 7 | 0 | 2.80E-10 | 26.75 | 1.60E-13 |
| | 0 | 0 | 2.80E-10 | 24.97 | 1.60E-13 |
| | 1 | 0 | 2.80E-10 | 24.92 | 1.60E-13 |
| | 2 | 0 | 6.20E-07 | 20.74 | 6.90E-07 |

FIG. 6

| 62.138 | | | CP_SITV-03-128.130.62.132 | | |
|---|---|---|---|---|---|
| Berproj | Fec(t=15) | DSC | SNR | prbsstat | Berproj |
| 3.20E-39 | 0 | 2.80E-10 | 27.68 | 1.60E-13 | 3.20E-39 |
| 3.20E-39 | 0 | 2.80E-10 | 27.50 | 1.60E-13 | 3.20E-39 |
| 3.20E-39 | 0 | 2.80E-10 | 27.95 | 1.60E-13 | 3.20E-39 |
| 3.20E-39 | 0 | 2.80E-10 | 26.32 | 1.60E-13 | 3.20E-39 |
| 4.19E-22 | 0 | 2.80E-10 | 27.29 | 1.60E-13 | 3.20E-39 |
| 9.39E-21 | 0 | 2.80E-10 | 26.90 | 1.60E-13 | 3.20E-39 |
| 3.20E-39 | 0 | 2.80E-10 | 28.14 | 1.60E-13 | 3.20E-39 |
| 3.20E-39 | 0 | 2.80E-10 | 26.94 | 1.60E-13 | 3.20E-39 |
| 3.20E-39 | 0 | 2.80E-10 | 27.85 | 1.60E-13 | 3.20E-39 |
| 3.20E-39 | 0 | 2.80E-10 | 26.81 | 1.60E-13 | 3.20E-39 |
| 3.20E-39 | 0 | 2.80E-10 | 27.76 | 1.60E-13 | 3.20E-39 |
| 3.20E-39 | 0 | 2.80E-10 | 27.68 | 1.60E-13 | 3.20E-39 |
| 3.20E-39 | 0 | 2.80E-10 | 27.69 | 1.60E-13 | 3.20E-39 |
| 3.20E-39 | 0 | 2.80E-10 | 27.14 | 1.60E-13 | 3.20E-39 |
| 3.20E-39 | 0 | 2.80E-10 | 27.08 | 1.60E-13 | 3.20E-39 |
| 3.20E-39 | 0 | 2.80E-10 | 27.97 | 1.60E-13 | 3.20E-39 |
| 3.20E-39 | 0 | 2.80E-10 | 27.39 | 1.60E-13 | 3.20E-39 |
| 3.20E-39 | 0 | 2.80E-10 | 27.37 | 1.60E-13 | 3.20E-39 |
| 3.20E-39 | 0 | 2.80E-10 | 27.43 | 1.60E-13 | 3.20E-39 |
| 3.20E-39 | 0 | 2.80E-10 | 26.79 | 1.60E-13 | 3.20E-39 |
| 2.3SE-19 | 0 | 2.80E-10 | 26.61 | 1.60E-13 | 3.20E-39 |

FIG. 6 (Cont'd)

| CP_SITV-04-128.130.62.225 | | | | | CP_SITV-05-128.130.62.206 | | | | | |
|---|---|---|---|---|---|---|---|---|---|---|
| Fec(t=15) | DSC | SNR | prbsstat | Berproj | Fec(t=15) | DSC | SNR | DSC | Berproj | Fec(t= |
| 0 | 2.80E-10 | 27.83 | 1.60E-13 | 3.20E-39 | 0 | 2.80E-10 | 27.51 | 1.60E-13 | 3.20E-39 | |
| 0 | 2.80E-10 | 27.68 | 1.60E-13 | 3.20E-39 | 0 | 2.80E-10 | 27.65 | 1.60E-13 | 3.20E-39 | |
| 0 | 2.80E-10 | 26.60 | 1.60E-13 | 3.20E-39 | 0 | 2.80E-10 | 27.14 | 1.60E-13 | 3.20E-39 | |
| 0 | 2.80E-10 | 25.92 | 1.60E-13 | 3.20E-39 | 0 | 2.80E-10 | 27.66 | 1.60E-13 | 3.20E-39 | |
| 0 | 2.80E-10 | 23.47 | 4.20E-12 | 4.71E-22 | 0 | 2.80E-10 | 28.06 | 4.20E-12 | 3.20E-39 | |
| 0 | 2.80E-10 | 23.90 | 2.20E-12 | 2.21E-33 | 0 | 2.80E-10 | 27.47 | 2.20E-12 | 3.20E-39 | |
| 0 | 2.80E-10 | 27.88 | 1.60E-13 | 3.20E-39 | 0 | 2.80E-10 | 26.98 | 1.60E-13 | 3.20E-39 | |
| 0 | 2.80E-10 | 27.71 | 1.60E-13 | 3.20E-39 | 0 | 2.80E-10 | 27.35 | 1.60E-13 | 3.20E-39 | |
| 0 | 2.80E-10 | 27.44 | 1.60E-13 | 3.20E-39 | 0 | 2.80E-10 | 27.42 | 1.60E-13 | 3.20E-39 | |
| 0 | 2.80E-10 | 26.44 | 1.60E-13 | 3.20E-39 | 0 | 2.80E-10 | 27.32 | 1.60E-13 | 3.20E-39 | |
| 0 | 2.80E-10 | 27.73 | 1.60E-13 | 3.20E-39 | 0 | 2.80E-10 | 27.28 | 1.60E-13 | 3.20E-39 | |
| 0 | 2.80E-10 | 27.83 | 1.60E-13 | 3.20E-39 | 0 | 2.80E-10 | 27.99 | 1.60E-13 | 3.20E-39 | |
| 0 | 2.80E-10 | 27.81 | 1.60E-13 | 3.20E-39 | 0 | 2.80E-10 | 27.68 | 1.60E-13 | 3.20E-39 | |
| 0 | 2.80E-10 | 27.12 | 1.60E-13 | 3.20E-39 | 0 | 2.80E-10 | 27.36 | 1.60E-13 | 3.20E-39 | |
| 0 | 2.80E-10 | 27.09 | 1.60E-13 | 3.20E-39 | 0 | 2.80E-10 | 27.52 | 1.60E-13 | 3.20E-39 | |
| 0 | 2.80E-10 | 27.70 | 1.60E-13 | 3.20E-39 | 0 | 2.80E-10 | 28.09 | 1.60E-13 | 3.20E-39 | |
| 0 | 2.80E-10 | 27.44 | 1.60E-13 | 3.20E-39 | 0 | 2.80E-10 | 27.37 | 1.60E-13 | 3.20E-39 | |
| 0 | 2.80E-10 | 27.39 | 1.60E-13 | 3.20E-39 | 0 | 2.80E-10 | 27.28 | 1.60E-13 | 3.20E-39 | |
| 0 | 2.80E-10 | 26.71 | 1.60E-13 | 3.20E-39 | 0 | 2.80E-10 | 27.87 | 1.60E-13 | 3.20E-39 | |
| 0 | 2.80E-10 | 25.80 | 1.60E-13 | 3.20E-39 | 0 | 2.80E-10 | 28.25 | 1.60E-13 | 3.20E-39 | |
| 0 | 2.80E-10 | 24.49 | 1.60E-13 | 3.20E-39 | 0 | 2.80E-10 | 28.15 | 1.60E-13 | 3.20E-39 | |

|  |  | | NW | CPSITV | |
|---|---|---|---|---|---|
| 10 | 3 | 0 | 2.80E-10 | 23.37 | 4.00E-11 |
|  | 4 | 0 | 2.80E-10 | 27.09 | 1.60E-13 |
|  | 5 | 0 | 2.80E-10 | 26.81 | 1.60E-13 |
|  | 6 | 0 | 2.80E-10 | 26.17 | 1.60E-13 |
|  | 7 | 0 | 2.80E-10 | 26.23 | 1.60E-13 |
| 11 | 0 | 0 | 2.80E-10 | 27.23 | 1.60E-13 |
|  | 1 | 0 | 2.80E-10 | 27.71 | 1.60E-13 |
|  | 2 | 0 | 2.80E-10 | 27.23 | 1.60E-13 |
|  | 3 | 0 | 2.80E-10 | 27.76 | 1.60E-13 |
|  | 4 | 0 | 2.80E-10 | 27.50 | 1.60E-13 |
|  | 5 | 0 | 2.80E-10 | 27.33 | 1.60E-13 |
|  | 6 | 0 | 2.80E-10 | 26.37 | 1.60E-13 |
|  | 7 | 0 | 2.80E-10 | 27.03 | 1.60E-13 |
|  | 0 | 0 | 2.80E-10 | 23.65 | 3.40E-12 |
|  | 1 | 0 | 2.80E-10 | 24.43 | 1.60E-13 |
|  | 2 | 0 | 5.90E-08 | 21.47 | 6.90E-08 |

| | | | | |
|---|---|---|---|---|
| 1.01E-22 | 0 | 2.80E-10 | 26.93 | 1.60E-13 | 3.20E-39 |
| 3.20E-39 | 0 | 2.80E-10 | 27.85 | 1.60E-13 | 3.20E-39 |
| 3.20E-39 | 0 | 2.80E-10 | 27.51 | 1.60E-13 | 3.20E-39 |
| 3.20E-39 | 0 | 2.80E-10 | 27.80 | 1.60E-13 | 3.20E-39 |
| 3.20E-39 | 0 | 2.80E-10 | 27.13 | 1.60E-13 | 3.20E-39 |
| 3.20E-39 | 0 | 2.80E-10 | 27.50 | 1.60E-13 | 3.20E-39 |
| 3.20E-39 | 0 | 2.80E-10 | 28.18 | 1.60E-13 | 3.20E-39 |
| 3.20E-39 | 0 | 2.80E-10 | 27.74 | 1.60E-13 | 3.20E-39 |
| 3.20E-39 | 0 | 2.80E-10 | 27.65 | 1.60E-13 | 3.20E-39 |
| 3.20E-39 | 0 | 2.80E-10 | 27.02 | 1.60E-13 | 3.20E-39 |
| 3.20E-39 | 0 | 2.80E-10 | 27.98 | 1.60E-13 | 3.20E-39 |
| 3.20E-39 | 0 | 2.80E-10 | 27.61 | 1.60E-13 | 3.20E-39 |
| 3.20E-39 | 0 | 2.80E-10 | 27.71 | 1.60E-13 | 3.20E-39 |
| 1.44E-24 | 0 | 2.80E-10 | 27.23 | 1.60E-13 | 3.20E-39 |
| 3.20E-39 | 0 | 2.80E-10 | 26.07 | 1.60E-13 | 3.20E-39 |
| 6.99E-22 | 0 | 2.80E-10 | 26.35 | 1.60E-13 | 3.20E-39 |

| 0 | 6.70E-09 | 22.23 | 8.50E-90 | 1.06E-24 | 0 | 2.80E-10 | 27.86 | 1.60E-13 | 3.20E-39 |
|---|---|---|---|---|---|---|---|---|---|
| 0 | 2.80E-10 | 27.35 | 1.60E-13 | 3.20E-39 | 0 | 2.80E-10 | 27.59 | 1.60E-13 | 3.20E-39 |
| 0 | 2.80E-10 | 27.47 | 1.60E-13 | 3.20E-39 | 0 | 2.80E-10 | 28.36 | 1.60E-13 | 3.20E-39 |
| 0 | 2.80E-10 | 27.64 | 1.60E-13 | 3.20E-39 | 0 | 2.80E-10 | 28.14 | 1.60E-13 | 3.20E-39 |
| 0 | 2.80E-10 | 26.76 | 1.60E-13 | 3.20E-39 | 0 | 2.80E-10 | 27.85 | 1.60E-13 | 3.20E-39 |
| 0 | 2.80E-10 | 27.68 | 1.60E-13 | 3.20E-39 | 0 | 2.80E-10 | 27.72 | 1.60E-13 | 3.20E-39 |
| 0 | 2.80E-10 | 28.18 | 1.60E-13 | 3.20E-39 | 0 | 2.80E-10 | 27.99 | 1.60E-13 | 3.20E-39 |
| 0 | 2.80E-10 | 28.14 | 1.60E-13 | 3.20E-39 | 0 | 2.80E-10 | 27.89 | 1.60E-13 | 3.20E-39 |
| 0 | 2.80E-10 | 27.83 | 1.60E-13 | 3.20E-39 | 0 | 2.80E-10 | 27.69 | 1.60E-13 | 3.20E-39 |
| 0 | 2.80E-10 | 27.27 | 1.60E-13 | 3.20E-39 | 0 | 2.80E-10 | 27.52 | 1.60E-13 | 3.20E-39 |
| 0 | 2.80E-10 | 27.82 | 1.60E-13 | 3.20E-39 | 0 | 2.80E-10 | 28.29 | 1.60E-13 | 3.20E-39 |
| 0 | 2.80E-10 | 27.76 | 1.60E-13 | 3.20E-39 | 0 | 2.80E-10 | 27.93 | 1.60E-13 | 3.20E-39 |
| 0 | 2.80E-10 | 27.61 | 1.60E-13 | 3.20E-39 | 0 | 2.80E-10 | 27.73 | 1.60E-13 | 3.20E-39 |
| 0 | 2.80E-10 | 25.44 | 1.60E-13 | 3.20E-39 | 0 | 2.80E-10 | 27.51 | 1.60E-13 | 3.20E-39 |
| 0 | 2.80E-10 | 24.91 | 1.60E-13 | 3.20E-39 | 0 | 2.80E-10 | 27.99 | 1.60E-13 | 3.20E-39 |
| 0 | 1.70E-09 | 22.49 | 1.30E-09 | 1.13E-21 | 0 | 2.80E-10 | 27.82 | 1.60E-13 | 3.20E-39 |

METHOD AND SYSTEM FOR HIGH SPEED CABLE TESTING

PRIORITY CLAIM

The present disclosure claims the benefit of and priority to U.S. Provisional Application Ser. No. 63/645,502, filed on May 10, 2024. The contents of that application are hereby incorporated by reference in their entirety.

TECHNICAL FIELD

The present disclosure relates generally to testing of computer systems. More particularly, aspects of this disclosure relate to a cable testing system that generates test signals to determine whether high speed cables in a computer device under test are properly connected and functioning.

BACKGROUND

Servers are employed in large numbers for high demand applications, such as network-based systems or data centers. The emergence of cloud computing applications has increased the demand for data centers. Data centers have numerous servers that store data and run applications accessed by remotely connected, computer device users. A typical data center has physical rack structures with attendant power and communication connections. Each rack may hold multiple application servers and storage servers. Each server generally includes hardware components such as processors, memory devices, network interface cards, power supplies, and other specialized hardware on a main board. Each of the servers generally includes a baseboard management controller that manages the operation of the server and communicates operational data to a central management station that manages the servers of the rack. There are numerous cables that serve as buses that connect the various components in a server and allow communication according to different protocols and speeds. The correct operation of such cables is essential to operation of the server.

There is a high need for the rapid manufacture of servers based on demand from data centers. Server manufacturing requires testing of the server components to ensure the final product meets specifications and is functioning properly. There are many high density and high speed cable routing structures in a computer system, and such cables must be tested to ensure cable signal quality before a server is completed. Due to the large number of cables and complex routine schemes, it is very difficult to identify cable signal quality before the main circuit board is installed into chassis.

In order to support cable quality qualification for a high-density cable routing system, a simple methodology to support high speed cable quality qualification of a system before installation of a main board to a chassis is required.

Thus, there is a need for a system that allows testing of a variety of high speed cable configurations prior to installation of a main board. There is also a need for a test system that allows generation of test signals for multiple tests for cable connections.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

One disclosed example is a computer cable test system that includes a first test vehicle module having a first controller and a first re-timer unit. A second test vehicle module has a second controller and a second re-timer unit. The first controller causes the first re-timer unit to generate a test signal for an end terminal of a cable. The second re-timer unit receives the test signal from an opposite end terminal of the cable. The second controller generates test data from the received test signal.

A further implementation of the example system is an embodiment where the first and second controllers are a baseboard management controller (BMC). The first test vehicle module includes a first memory coupled to the first controller. The second test vehicle module includes a second memory coupled to the second controller. Another implementation is where the first and second memories are a flash memory. The second controller stores the generated test data from the received test signal to a system error log in the second memory. Another implementation is where the first and second controller execute test diagnostic software to generate the test signal and generate the test data. Another implementation is where the second controller examines the test signal for signal defects or signal lock. Another implementation is where the test signal is a pseudo random binary sequence (PRBS) and is checked for one of bit error rate (BER), forward error correction, or signal quality. Another implementation is where the example test system includes an adaptor baseboard having a first connector coupled to the first re-timer unit and a second connector coupled to a cable connector on a cartridge backplane module. The cable connector holds the end terminal of the cable. Another implementation is where the second connector is one of a plurality of connectors having different pin configurations. Each of the plurality of connectors is attachable to a different cable connector. Another implementation is where the first and second re-timer units include a plurality of re-timer chips. Each of the re-timer chips have input/outputs that may be coupled to one of the terminals of the cable. Another implementation is where the first controller configures a pinout for a plurality of cables including the cable in the cartridge backplane module for connection to the input/outputs of the re-timer chips. Another implementation is where the second test vehicle module includes a management port allowing the test data to be accessed by an external device.

Another disclosed example is a method of testing a cable. An end terminal of the cable is coupled to a first re-timer unit on a first test vehicle module. An opposite end terminal of the cable is coupled to a second re-timer unit on a second test vehicle. A test signal from the first re-timer unit is transmitted to the end terminal of the cable via a command from a first controller. The test signal is received from the second re-timer unit from the opposite end terminal of the cable. Test data is generated from the test signal via a second controller.

Another implementation of the example method is where the test data from the received test signal is stored in a system error log in a memory. Another implementation is where the second controller examines the test signal for signal defects or signal lock. Another implementation is where the test signal is a pseudo random binary sequence (PRBS) checked for one of bit error rate (BER), forward error correction, or signal quality. Another implementation is where the coupling of the first re-timer unit to the end terminal of the cable includes connecting a first connector of an adaptor baseboard to the first re-timer unit and connecting a second connector of the adaptor baseboard to a cable connector on a cartridge backplane module. The cable connector holds the end terminal of the cable. Another implementation is where the second connector is selected from one of a plurality of connectors having different pin configurations. Each of the plurality of connectors is attachable to a different cable connector. Another implementation is where the first and second re-timer units include a plurality of re-timer chips. Each of the re-timer chips have input/outputs that may be coupled to one of the terminals of the cable. Another implementation is where the cable is one of a plurality of cables. The example method further includes configuring a pinout for the plurality of cables from a cable map for connection to the input/outputs of the re-timer chips.

Another disclosed example is a test vehicle module including a signal generator that may be a re-timer chip. The test vehicle module also includes a board management controller coupled to the signal generator. A memory is coupled to the board management controller. The memory stores diagnostic software executable by the board management controller. A connector is coupled to the signal generator to transmit and receive cable test signals from terminals of a cable through an adaptor baseboard. The controller executes the diagnostic software to send cable test signals through the signal generator, receives test signals from another test vehicle module, and generate test data from the received test signals.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 5 is a table of tests that are run on the cables by the example testing system in FIG. 1;

DETAILED DESCRIPTION OF THE ILLUSTRATED EMBODIMENTS

Figure 1:
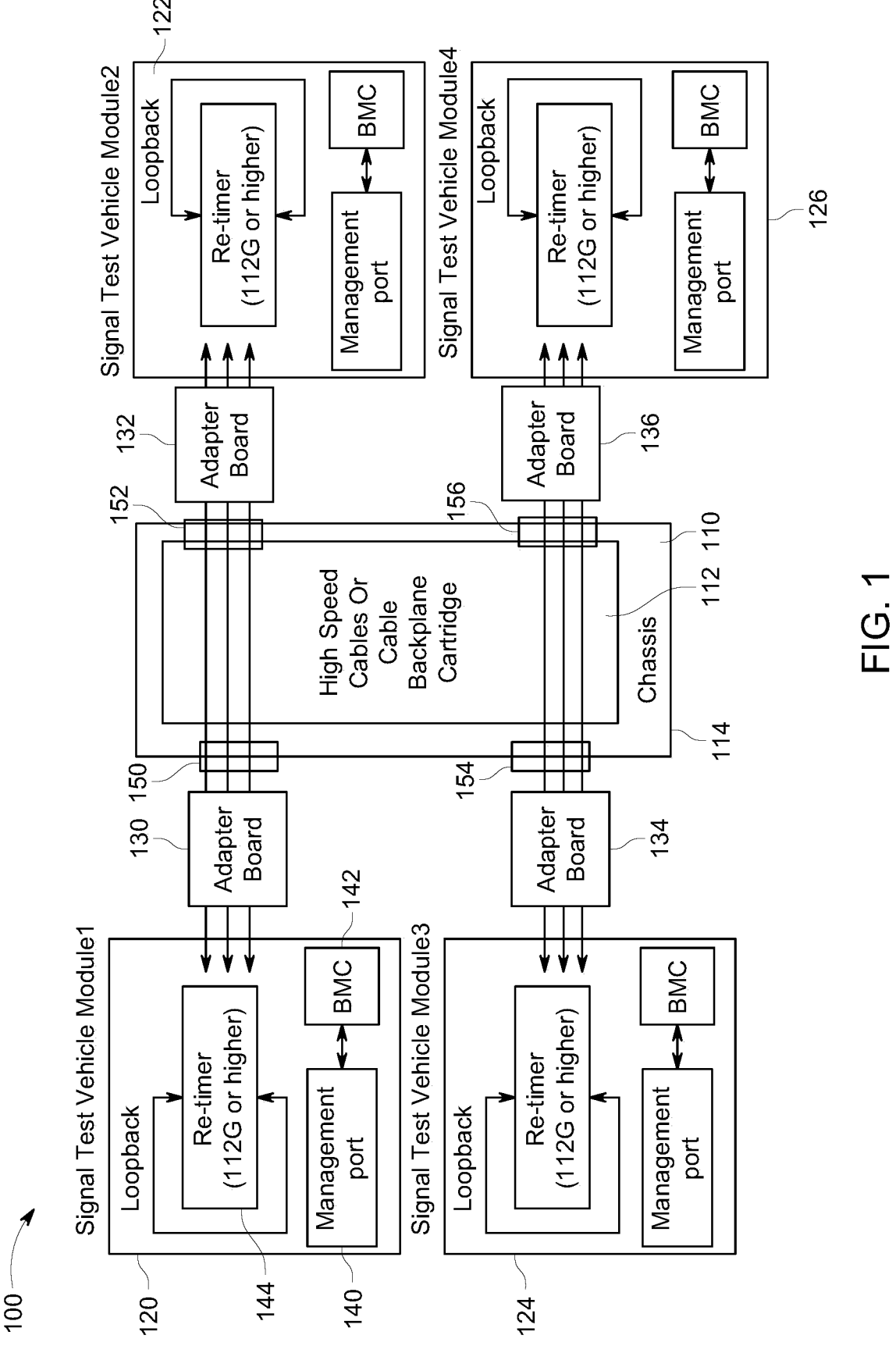
FIG. 1 is a block diagram of a testing system for a computing system that allows rapid and efficient cable testing.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

The present disclosure relates to a system to support cable quality qualification testing of high-density cable routing in a computing device such as a server. The example cable test system relies on a simple methodology to support high speed cable quality qualification of a computer system prior to installing the main circuit board into a chassis. The example testing system allows performance of diagnostic testing through a board management controller and a re-timer/module interface to trigger a cable signal test. The test signal is generated from the re-timer/repeater test-vehicle on one end of the terminals of cables of a cable module (cartridge).

Another example test vehicle module receives the signal from the other end of the terminals and can report cable wire signal quality status for users before the system main circuit board is installed into the chassis. If one of cables or wires of the cable module fails the testing, the cable module may be repaired or replaced in advance.

FIG. 1 shows a cable testing system 100 that allows testing of cables in a main circuit board 110 that includes a cable backplane module or cartridge 112. The cable backplane module 112 includes connectors that connect different cables. The connectors will be connected to various components on the main circuit board 110. The main circuit board 110 may be installed in a chassis 114 that constitutes a computer device such as a server. In this example, the cable testing system 100 includes four signal test vehicle modules 120, 122, 124, and 126. Each of the signal test vehicle modules 120, 122, 124, and 126 are attached to respective adaptor/interposer baseboards 130, 132, 134, and 136.

Each of the signal test vehicle modules such as the signal test vehicle module 120 includes a management port 140, a baseboard management controller 142, and a re-timer unit 144. In this example, the baseboard management controller 142 executes test diagnostic software for cable testing through generating test signals for the cables via the re-timer unit 144. The test diagnostic software also analyzes the signals received from the cables. In this example each of the adaptors/interposer baseboards 130, 132, 134, and 136 have a standard connector that enables signals to be transmitted and received from the re-timer units 144 of each of the signal test vehicle modules 120, 122, 124, and 126. The cable backplane module 112 has a series of cable connectors 150, 152, 154, and 156 that may be coupled to the respective adaptors/interposer baseboards 130, 132, 134, and 136. In this example, the cable connectors 150, 152, 154, and 156 may have different numbers of pins that each require a different type of adaptor baseboard. For example, for testing, if there are three different types of cable connectors (e.g., Arrangements Of 19 pins, 24 pins and 40 pins or connectors supplied by different vendors) on the cable backplane module 112, different adaptor baseboards compatible with each type are used. The number of signal test vehicle modules and adaptors, such as the signal test vehicle module 120 and the adaptor baseboard 130, to perform cable testing depends on the number and variety of cable connectors in the cable backplane module 112. As will be explained, the testing requires the signal generator on the signal test vehicle module 120, an adapter/interposer baseboard that serves as a connector module between the cable backplane module 112 and the signal test vehicle module 120, and the test diagnostic software for quality testing the cable and generating a report. One of the signal test vehicle modules such as the signal test vehicle module 120 may emit a series of test signals through cables of interest between connectors such as the cable connectors 150 and 152. Another signal test vehicle module such as the signal test vehicle module 122 may receive the test signals from the other end of the cables under test through the cable connector 152. The signal test vehicle module 122 executes the test diagnostic software to analyze the test signals received from the cables. Alternatively, the signal test vehicle module 122 may generate the test signals, and the signal test vehicle module 120 may execute the diagnostic software to analyze the received test signals. Thus, test signals may be transmitted and/or received by test modules connected to each opposite terminal of a cable. Similarly, the signal test vehicle modules 124 and 126 generate and receive test signals through the cable connectors 154 and 156.

Figure 2:
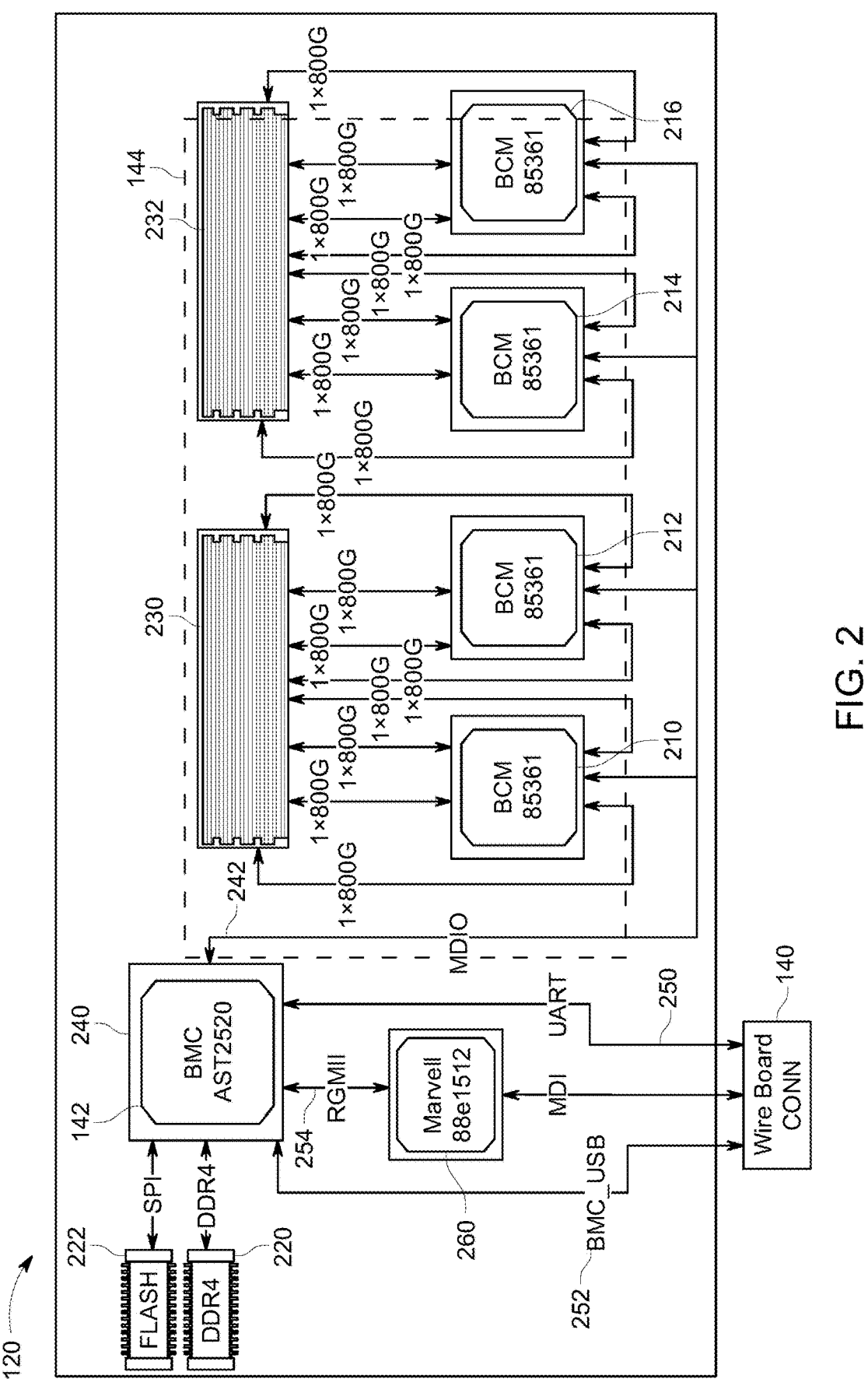
FIG. 2 is a block diagram of an example testing module in the testing system in FIG. 1.

FIG. 2 is a block diagram of an example signal test vehicle module such as the signal test vehicle module 120 in FIG. 1. The signal test vehicle module 120 has two key parts, the baseboard management controller 142 and the re-timer unit 144 that functions as the signal generator. The baseboard management controller 142 is responsible for accessing the signal generator in the signal test vehicle module 120. In this example, the baseboard management controller 142 is a programmable device such as a baseboard management controller (BMC), a field programmable gate array (FPGA), a micro-controller unit (MCU), a programmable logic controller (PLC), or the like. The signal generator may be a controller chip that can generate signals for different cable tests such as a pseudo random binary sequence (PRBS) or the like for the cable backplane. The signal generator controller chip may be a switch, a re-timer, or a repeater controller. In this example, the re-timer unit 144 includes four re-timer chips 210, 212, 214, and 216. For example, the re-timer chips 210, 212, 214, and 216 may be Broadcom BCM85361 configured with Broadcom PLP SDK APIs. However, any chip with similar features may be used. In this example, the baseboard management controller 142 is a baseboard management controller used to control the re-timer chips 210, 212, 214, and 216 via cable diagnostic software that may be executed by the baseboard management controller 142. The cable diagnostic software includes interface commands to generate different signals from the re-timer chips 210, 212, 214, and 216, as well as analyzing the received test signals. The baseboard management controller 142 may have access to a dynamic random access memory (DRAM) 220 and a non-volatile memory 222 such as a flash memory. In this example, the cable test diagnostic software is stored in the non-volatile memory 222. The results from executing the diagnostic software to analyze the received signals, such as determining bit error rate (BER), may be stored temporarily in the non-volatile memory 222. The test data may be accessed by an external device through the management port 140, which allows network communication via Ethernet in this example.

In this example, each re-timer chip 210, 212, 214, and 216 has a 4×800G (or higher speed) interface that allows transmission of the generated signals to a connector 230 or 232. The connectors 230 and 232 may be connected through an adaptor board such as the adaptor baseboard 130 in FIG. 1 to one terminal of the cables being testing. In the example diagram, each of the re-timer chips 210, 212, 214, and 216 have four 1×800G interfaces that are each coupled to the respective connectors 230 or 232. In the example cable test procedure, a user can control or configure the re-timers 210, 212, 214, and 216 via the baseboard management controller 142 to generate testing signals or receive testing signals through the connectors 230 or 232.

In this example, the baseboard management controller 142 may communicate with the re-timer chips 210, 212, 214, and 216 via a MDIO interface 240 to a MDIO bus 242. The baseboard management controller 142 may transmit test results through the management port 140 through either a UART line 250, a BMC USB0 pin 252 or through a RGMII line 254 to a physical interface chip 260.

Figure 3:
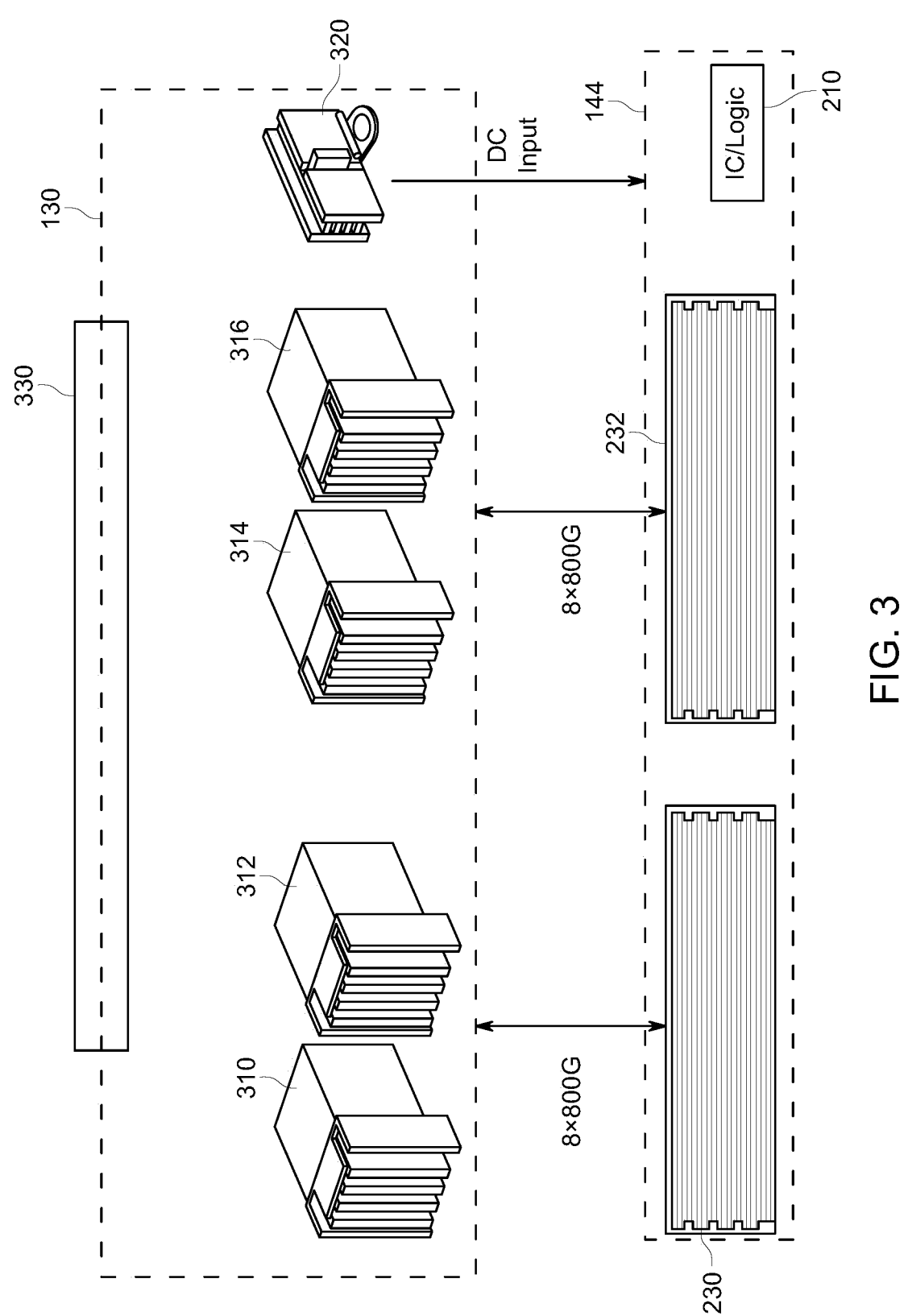
FIG. 3 is a diagram of the adapter board coupling an example testing module to the cable connectors of the device under test in the test system in FIG. 1.

FIG. 3 is a block diagram for the connections between an adaptor board such as the adaptor baseboard 130 in FIG. 1 and the connectors of the re-timer unit such as the re-timer unit 144 of the signal test vehicle modules 120 (in FIG. 2). As explained above, the signal test vehicle module 120 includes the two connectors 230 and 232 as shown in FIG. 2 that are each 8×800G. The adaptor baseboard 130 includes four 4×800G connectors 310, 312, 314, and 316 that are coupled to the connectors 230 and 232 of the re-timer unit 144. The adaptor baseboard 130 includes a DC power interface input 320 that supplies DC power to the signal test vehicle module 120. The other end of the adaptor baseboard 130 includes a connector 330 that has a pin configuration specific to the connectors on the device under test such as the cable backplane module 112 in FIG. 1.

The adaptor baseboard 130 connects the re-timer chips to the connector on the cable backplane module 112 that is the terminal end of cables. The cable testing system 100 passes test signals between the terminals of the cables of the cable backplane module 112 to determine whether the cables are connected correctly and are transmitting signals according to specification. The purpose of the cable testing system 100 is to bridge/re-map the signal test vehicle modules to different system/system cable routing designs. The cable testing system 100 thus reduces testing loss, production costs, and design costs of current different test system platforms by the use of the test vehicle modules with different adaptor/interposer baseboards for testing different systems.

Figure 4:
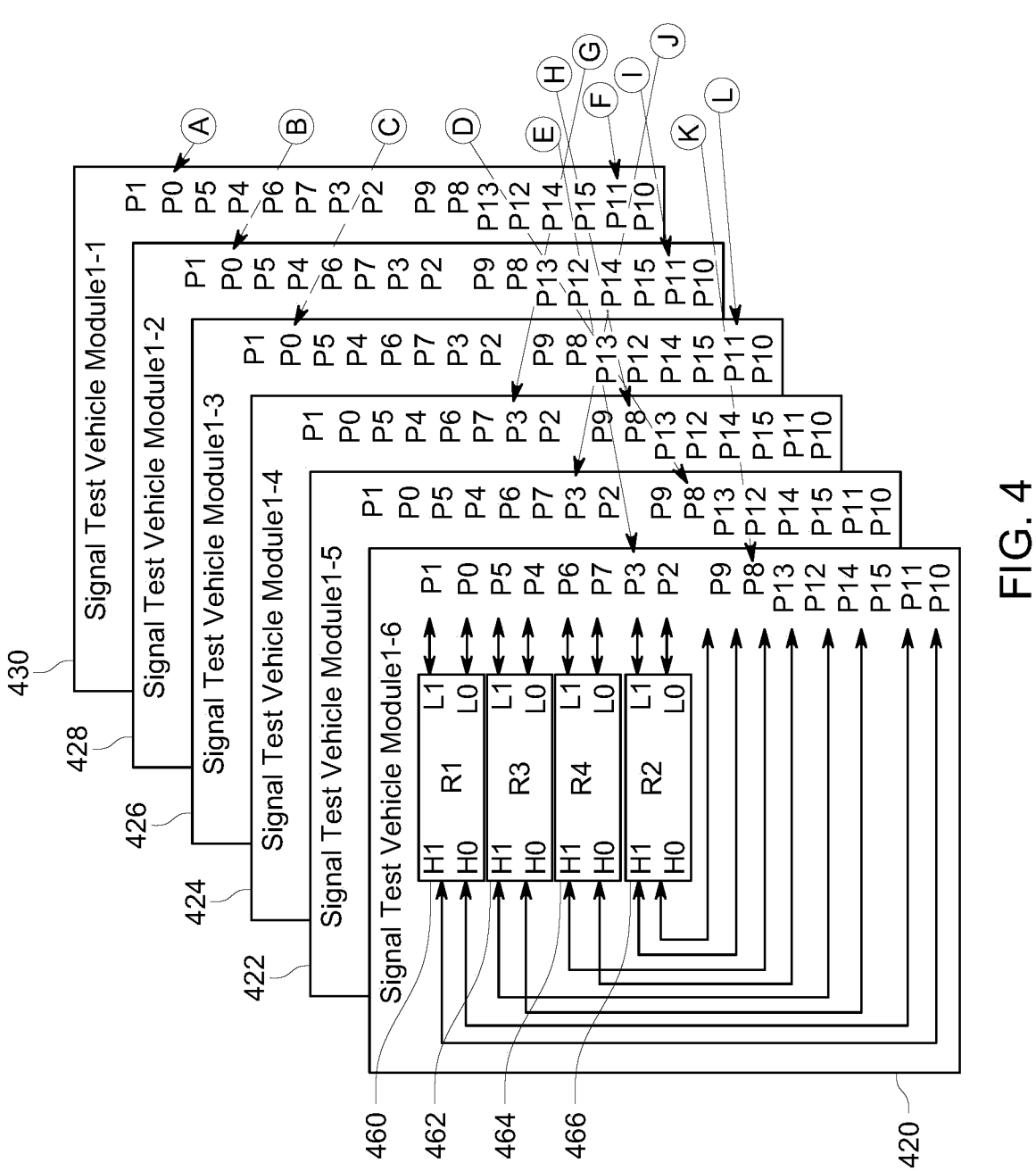
FIG. 4 an example diagram of cable connections between the example test modules for purposes of testing cables.
Figure 4:
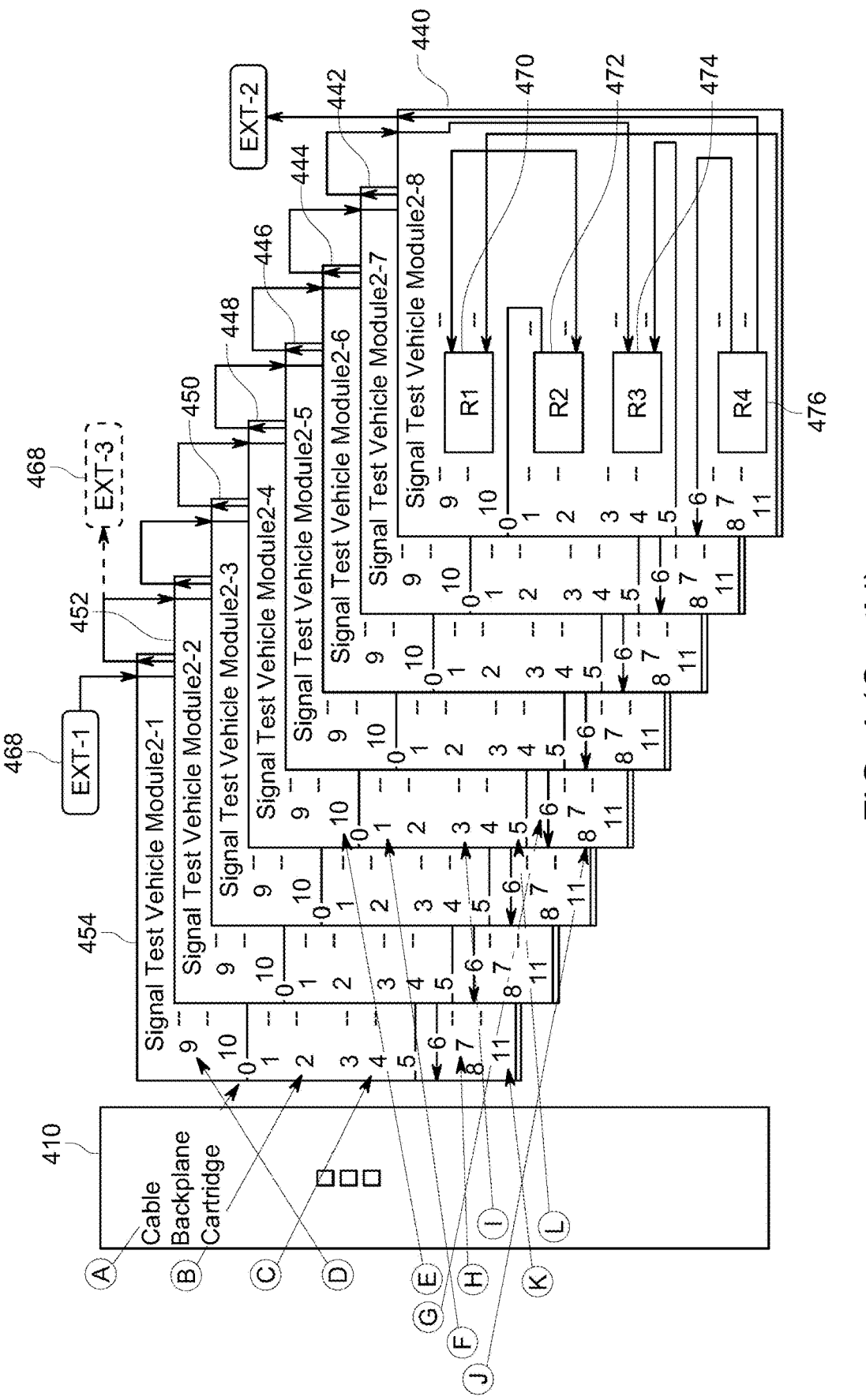

FIG. 4 shows a physical cable connection map between signal test modules that are connected to an example cable backplane cartridge 410 that includes a series of cables. The testing system that includes six transmitter signal test modules 420, 422, 424, 426, 428, and 430 and eight receiver signal test modules 440, 442, 444, 446, 448, 450, 452, and 454. In this example, each of the transmitter signal test modules include sixteen pins and four re-timer chips such as the re-timer chips 460, 462, 464, and 466 in the test module 420. Additional tests may be run via external packet input/output ports 468. Each of the four re-timer chips 460, 462, 464, and 466 have four input/outputs that are each coupled to one of the pins. In this example, each of the test modules have 16 pins that are divided into 4 pin groups. In this example, the pins are divided into two 8×800G connectors such as the connectors 230 and 232 in FIG. 2. In this example, each of the re-timer chips 460 and 462 have four pins coupled to one of the connectors and each of the re-timer chips 464 and 466 have pins coupled to the other one of the connectors. The re-timer chips may either generate signals that are output through one of the pins or receive signals through one of the pins. Correspondingly, each of the receiver signal test modules include sixteen pins and four re-timer chips such as the re-timer chips 470, 472, 474, and 476 in the test module 440.

In this example, a cable map will determine connections internally through the cable backplane cartridge 410 between different cables. The map is read by the diagnostic software to determine the pins corresponding to the end terminals of the cables to be tested. The diagnostic software will read the cable map to determine the re-timer chips that send signals on certain pins and receive signals on certain pins for testing. In this example, the transmitter signal test modules such as the transmitter signal test modules 420, 422, 424, 426, 428, and 430 send a test signal through the terminal of one of the cables connected to the pins based on the cable map. One of the receiver signal test modules 440, 442, 444, 446, 448, 450, 452, and 454 has a pin that is coupled to the other end of the cable that is tested. Of course, any of the receiver signal test modules 440, 442, 444, 446, 448, 450, 452, and 454 may be configured to be transmitter signal test modules and any of the transmitter signal test modules 420, 422, 424, 426, 428, and 430 may be configured to be receiver signal test modules.

The test diagnostic software controls the re-timer chips to generate test signals and will receive signals from the re-timer chips to record the resulting test signals. The software also produces a report of the test results. In this example, the connections between the transmitter signal test modules 420, 422, 424, 426, 428, and 430 and receiver signal test modules 440, 442, 444, 446, 448, 450, 452, and 454 follows a pin map of cables in the cable backplane cartridge 410 to setup configuration of signal test vehicle re-timer modules. The re-timer of the transmitter modules sends test signals through an adaptor board (not shown) to the cable backplane cartridge 410. The corresponding re-timer of the receiver module receives the signals and provides the output to the board management controller.

In this example, the re-timer chip 466 of the transmitter signal test module 420 sends test signals through the pins 3 and 8 of the transmitter signal test module 420. The test signals are sent through the pins 3 and 8 and received by pin 10 of the receiver signal test module 448 and pin 11 of the receiver signal test module 454. The respective re-timer chips of the receiver signal test module 448 and the receiver signal test module 454 send the received signals to the respective board management controllers. The signals are recorded and corresponding test data is output relating to the received signal.

The example setup in FIG. 4 shows a part of cable connection. Only a certain subset of cable connections is shown in FIG. 4 for simplicity of explanation. Usually, the system cables or cable backplane module (cartridge), such as the cable backplane module 112 in FIG. 1 is a complex cable network and thus FIG. 4 is a simplified map for purposes of explanation. If all typical cable connections were drawn in FIG. 4, the setup would be more complex with up to 6×16 connections. Using the cables or cable module (cartridge) verification topology, the test system facilitates determining cable signal quality and which cable segments are failing.

FIG. 5 is a table 500 that shows the number of tests that may be conducted by the diagnostic software. The transmitter generally generates a test pattern, and the receiver checks the statistics of the test pattern through a pseudo random binary sequence (PRBS) math formula. A first column of the table 500 is the test item. A second column is the serializer/deserializer (SERDES) scope of the test. A third column is the items that are checked for the tests.

Each of the rows of the table 500 lists different tests that may be performed by the diagnostic software. A first row 510 is to check lane map settings. A second row 512 is to check the polarity settings. A third row 514 is the SERDES status dump. The SERDES status dump is the transmitter and receiver status for the current differential pair signals SERDES. The SD is the signal detect, LCK is the signal lock, TXEQ is the transmitter equalization parameters. The signal detect and signal lock assists a tester to understand if the SERDES differential pair is open or nearly open, or if there is something wrong with the differential pair signal, such as signal quality issue. A fourth row 516 is the show port status. A fifth row 518 is a bit error rate (BER) projection, which is a method to have statistics with a test pattern accumulated through forward error correction (FEC) bit error counters and summarized as a Post-FEC bit error rate (BER). A sixth row 520 is a forward error correction (FEC) status error counter monitor. This is a monitoring service that will accumulate the error counters from the forward error correction (FEC) engine inside the re-timer chips. A last row 522 is a cross talk test that relies on a pseudo random binary sequence (PRBS). The cross talk test is a comparison between one SERDES lane signal quality over all SERDES lane signal quality combined.

Figure 6:
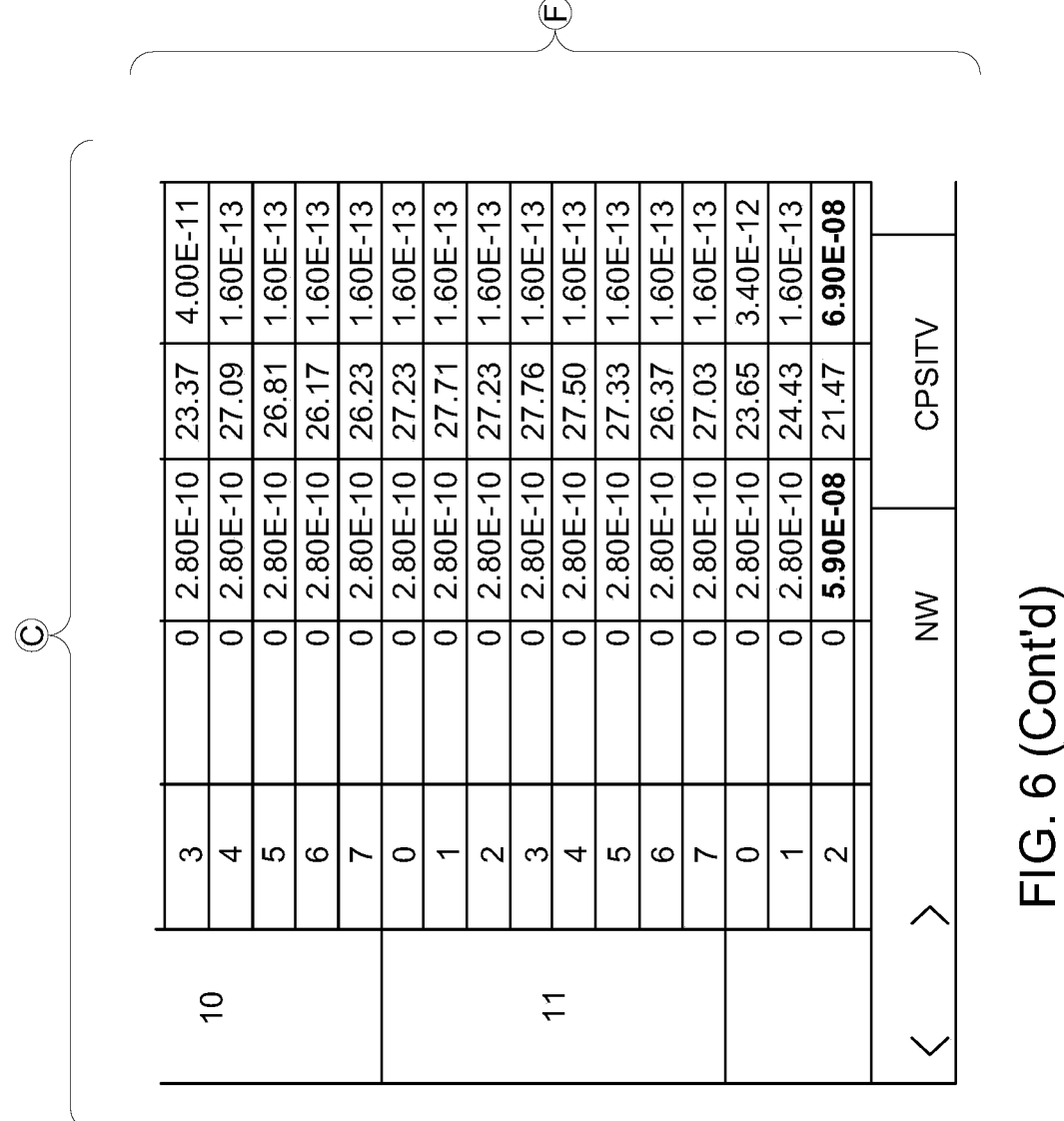
FIG. 6 is a screen image of example test results from testing high speed cables by the example testing system in FIG. 1.
Figure 6:
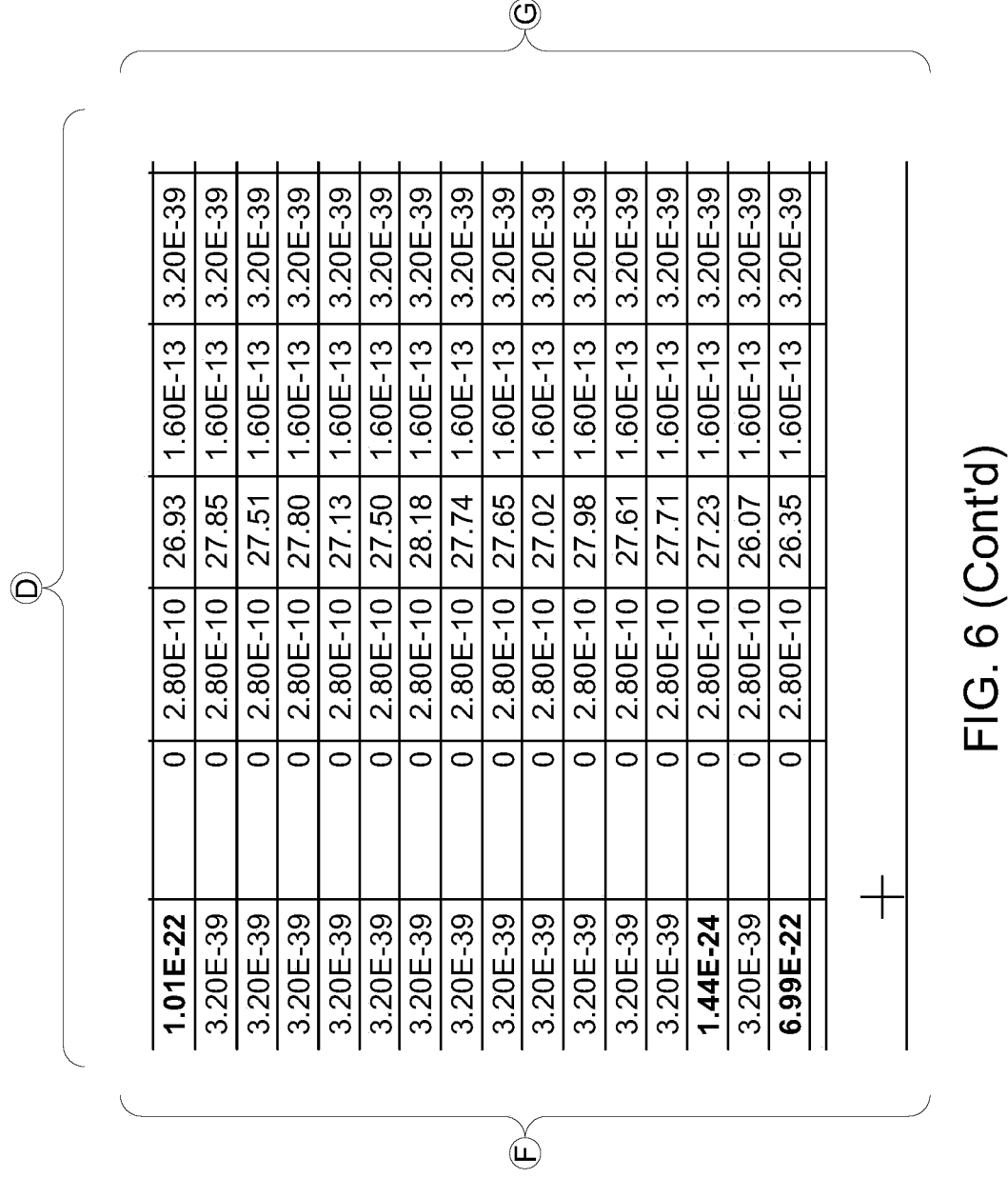

FIG. 6 is an example test result output chart 600 generated by the diagnostic software in the cable test system 100 in FIG. 1. The chart 600 is organized by individual lanes for each port. Each specific lane includes a designation such as CP_SITV-02-129.130.62.138 for each set of tests. For each test in this example, the value under DSC, which is the Pre-FEC BER for 100 milliseconds. The PRBS STAT value is an output of the PRBS error statistics tool, which will collect Pre-FEC BER for up to 180 seconds for this example. The BERPROJ value is the BER projection from Post-FEC that reflects type 0~15 error histogram. This assists a tester to understand the distribution of the errors from FEC engine. The BERPROJ value shows the Post-FEC, which the BER is corrected by FEC. The t=15 error means that is uncorrectable error. Different cells in the output chart may be highlighted with colors. For example, a cell with no color indicates a passing result. A cell with a green color (represented by the bold cells in the chart 600) may indicate that the test results pass but are lower than other ports. A cell with a red color may indicate that the result is higher than the criterion for the cable connection.

Figure 7:
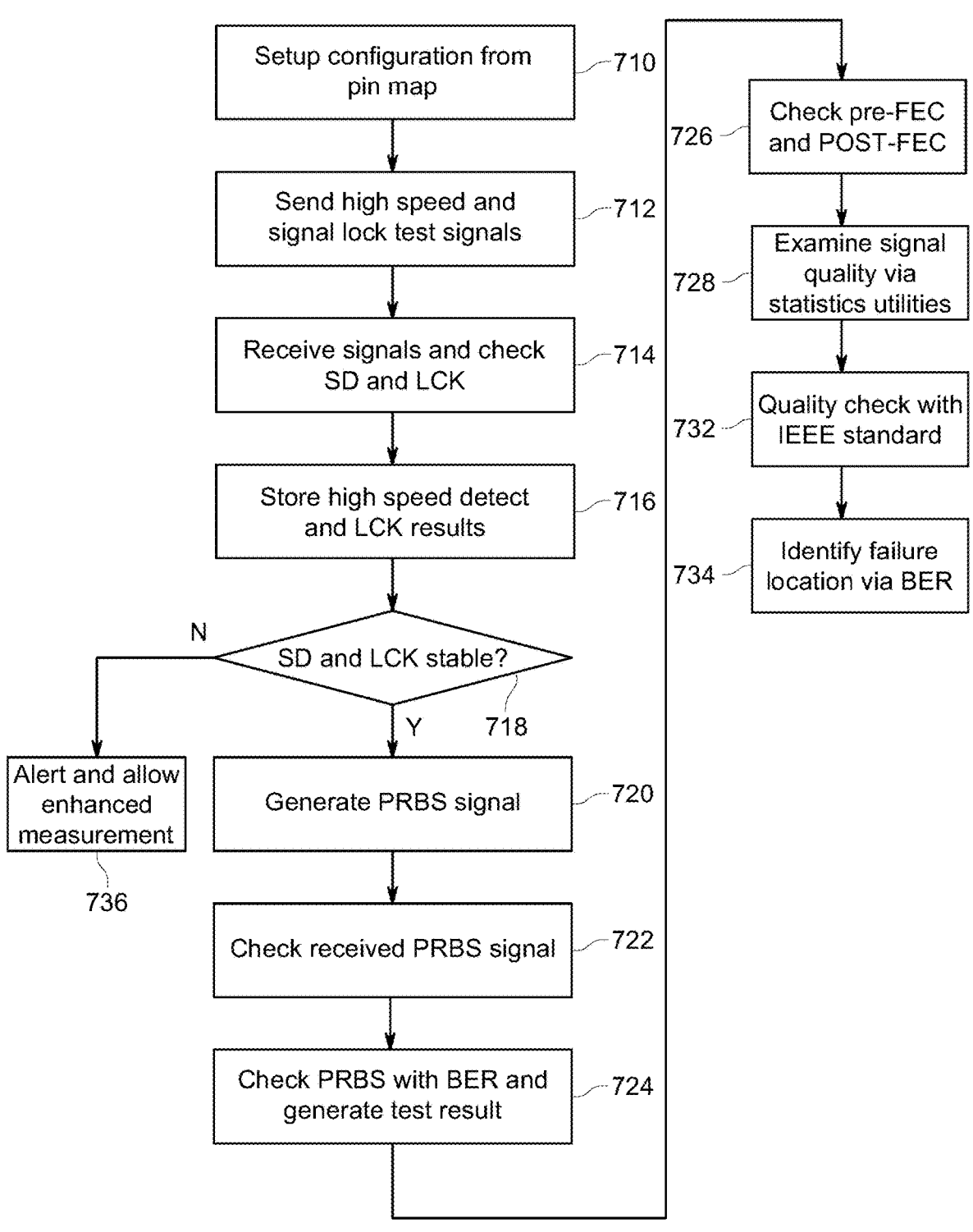
FIG. 7 is a flow diagram of an example routine for conducting cable testing in the cartridge module in FIG. 1.

The flow diagram in FIG. 7 is representative of example machine readable instructions for executing diagnostic testing of cables in the computer system that includes the cable backplane module 112 in FIG. 1. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In this example, the routine first follows a pin map of cables of the cartridge to setup configuration of signal test vehicle module re-timer chips (710). The re-timer chip of the transmitter module sends test signals for testing high speed signals and signal lock (712). The re-timer of the receiver module receives the signals and examines high speed SD (signal detect), and LCK (signal lock) (714). A test result for the high speed signal detection and signal lock is generated (716).

The diagnostic software determines if the signal received by the re-timer receiver has satisfied high signal detection and whether the signal lock is stable (718). If the high speed signal detection and signal lock are stable (718), the re-timer of the transmitter module generates a pseudo random binary sequence (PRBS) (720). The received PRBS signal is checked by the board management controller of the receiver module (722). The PRBS result is checked with a bit error rate (BER) and the test result of cable quality is generated based on the BER (724).

If the signal transmitter and receiver modules are using FEC (Forward Error Correction), then the PreFEC BER (bit error rate without forward error correction), and PostFEC BER (bit error rate with forward error correction) is examined via an appropriate API such as a Broadcom PLP SDK (726). The routine then uses further applicable receiver statistics utilities to examine signal quality between transmitter side and receiver side (728). The routine then examines signal quality with IEEE 802.3 standards (732). The routine then checks the BER result and uses the PreFEC/PostFEC BER to identify failure cable/wire location (734). In this example, IEEE 802.3 standards define the SERDES BER limits and the PreFEC BER (e.g., 1.0e-06). The standards are used to check the BER results from re-timer SDK tools. If the signal lock is not stable (718), an alert is issued (736). A tester may then perform an enhanced measurement on the differential pair, such as open-short test, an A/B test, or other approach that would help to understand the root cause of the unstable indicator.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer cable test system comprising:
a first test vehicle module including a first controller and a first re-timer unit, wherein the first controller causes the first re-timer unit to generate a test signal for an end terminal of a cable; and
a second test vehicle module including a second controller and a second re-timer unit, wherein the second re-timer unit receives the test signal from an opposite end terminal of the cable, and the second controller of the second test vehicle generates test data from the received test signal.

2. The system of claim 1, wherein each of the first and second controllers is a baseboard management controller (BMC), wherein the first test vehicle module includes a first memory coupled to the first controller, and wherein the second test vehicle module includes a second memory coupled to the second controller.

3. The system of claim 2, wherein each of the first and second memories is a flash memory, wherein the second controller stores the generated test data from the received test signal to a system error log in the second memory.

4. The system of claim 3, wherein the first and second controllers execute test diagnostic software to generate the test signal and the test data.

5. The system of claim 1, wherein the second controller examines the test signal for signal defects or a signal lock.

6. The system of claim 1, wherein the test signal is a pseudo random binary sequence (PRBS) checked for one of bit error rate (BER), forward error correction, or signal quality.

7. The system of claim 1, further comprising an adaptor baseboard having a first connector coupled to the first re-timer unit and a second connector coupled to a cable connector on a cartridge backplane module, wherein the cable connector holds the end terminal of the cable.

8. The system of claim 7, wherein the second connector is one of a plurality of connectors having different pin configurations, each of the plurality of connectors being attachable to a different cable connector.

9. The system of claim 7, wherein the first and second re-timer units include a plurality of re-timer chips, each of the re-timer chips having input/outputs that may be coupled to one of the terminals of the cable.

10. The system of claim 9, wherein the first controller configures a pinout for a plurality of cables including the cable in the cartridge backplane module for connection to the input/outputs of the re-timer chips.

11. The system of claim 1, wherein the second test vehicle module includes a management port allowing the test data to be accessed by an external device.

12. A method of testing a cable, the method comprising:
coupling an end terminal of the cable to a first re-timer unit on a first test vehicle module;
coupling an opposite end terminal of the cable to a second re-timer unit on a second test vehicle module;
transmitting a test signal from the first re-timer unit to the end terminal of the cable via a command from a first controller;
receiving the test signal from the second re-timer unit from the opposite end terminal of the cable; and
generating test data from the test signal via a second controller.

13. The method of claim 12, further comprising storing the test data from the received test signal in a system error log in a memory.

14. The method of claim 12, further comprising examining the test signal for signal defects or signal lock via the second controller.

15. The method of claim 12, wherein the test signal is a pseudo random binary sequence (PRBS) checked for one of bit error rate (BER), a forward error correction, or a signal quality.

16. The method of claim 12, wherein the coupling of the first re-timer unit to the end terminal of the cable includes connecting a first connector of an adaptor baseboard to the first re-timer unit and connecting a second connector of the adaptor baseboard to a cable connector on a cartridge backplane module, wherein the cable connector holds the end terminal of the cable.

17. The method of claim 16, wherein the second connector is selected from one of a plurality of connectors having different pin configurations, each of the plurality of connectors being attachable to a different cable connector.

18. The method of claim 16, wherein the first and second re-timer units include a plurality of re-timer chips, each of the re-timer chips having input/outputs couplable to one of the terminals of the cable.

19. The method of claim 18, wherein the cable is one of a plurality of cables, and the method further comprising configuring a pinout for the plurality of cables from a cable map for connection to the input/outputs of the re-timer chips.

20. A test vehicle module comprising:
a signal generator;
a board management controller coupled to the signal generator;
a memory coupled to the board management controller, the memory storing diagnostic software executable by the board management controller; and
a connector coupled to the signal generator to transmit and receive cable test signals from terminals of a cable through an adaptor baseboard, wherein the controller executes the diagnostic software to send cable test signals through the signal generator, receive cable test signals from another test vehicle module, and generate test data from the received test signals.

* * * * *